US011973822B2

(12) United States Patent
Gupta et al.

(10) Patent No.: US 11,973,822 B2
(45) Date of Patent: Apr. 30, 2024

(54) METHOD FOR HANDLING OF AN INBOUND SCTP PACKET AT AN SCTP LOAD BALANCER AND TUNNELING METHODOLOGY

(71) Applicant: Parallel Wireless, Inc., Nashua, NH (US)

(72) Inventors: Anoop Gupta, Pune (IN); Kartik Shashikant Raval, Pune (IN); Sanjay Harwani, Pune (IN)

(73) Assignee: Parallel Wireless, Inc., Nashua, NH (US)

( * ) Notice: Subject to any disclaimer, the term of this patent is extended or adjusted under 35 U.S.C. 154(b) by 0 days.

(21) Appl. No.: 17/688,815

(22) Filed: Mar. 7, 2022

(65) Prior Publication Data

US 2022/0286497 A1    Sep. 8, 2022

Related U.S. Application Data

(60) Provisional application No. 63/157,335, filed on Mar. 5, 2021.

(51) Int. Cl.
*H04L 67/1004* (2022.01)
*H04L 12/46* (2006.01)
*H04L 69/326* (2022.01)

(52) U.S. Cl.
CPC ...... *H04L 67/1004* (2013.01); *H04L 12/4633* (2013.01); *H04L 69/326* (2013.01); *H04L 2212/00* (2013.01)

(58) Field of Classification Search
CPC ............. H04L 12/4633; H04L 2212/00; H04L 67/1004; H04L 69/326
See application file for complete search history.

(56) References Cited

U.S. PATENT DOCUMENTS

| | | | |
|---|---|---|---|
| 8,549,146 B2 | 10/2013 | Stanisic et al. | |
| 9,332,053 B2 | 5/2016 | Sheer | |
| 10,932,306 B2* | 2/2021 | Zee | H04W 28/0861 |
| 2012/0155375 A1* | 6/2012 | Zhu | H04L 69/04 |
| | | | 370/315 |
| 2012/0230187 A1* | 9/2012 | Tremblay | H04L 67/1023 |
| | | | 370/230 |
| 2013/0167181 A1 | 6/2013 | Dixit et al. | |
| 2014/0153572 A1* | 6/2014 | Hampel | H04L 45/64 |
| | | | 370/392 |
| 2014/0310418 A1 | 10/2014 | Sorenson, III et al. | |
| 2016/0373304 A1 | 12/2016 | Sharma et al. | |
| 2017/0093724 A1 | 3/2017 | Bansal et al. | |
| 2017/0279723 A1* | 9/2017 | Vedam | H04L 43/12 |
| 2018/0205574 A1 | 7/2018 | Radunovic et al. | |

(Continued)

OTHER PUBLICATIONS

"5G; NG-RAN; NG signalling transport", (3GPP TS 38.412 version 15.0.0 Release 15), ETSI TS 138 412 V15.0.0 (Jul. 2018).

*Primary Examiner* — Mohamed A. Wasel
(74) *Attorney, Agent, or Firm* — Michael Y. Saji

(57) ABSTRACT

Methods and systems for handling of an inbound Stream Control Transmission Protocol (SCTP) packet at an SCTP load balancer (SCTP LB) are described. In one embodiment a method includes receiving, at the SCTP LB, an SCTP packet; determining, by the SCTP LB, which tunneling mechanism to use for the SCTP packet; and tunneling the SCTP packet to a correct back-end server for further processing of the SCTP packet.

20 Claims, 5 Drawing Sheets

(56) References Cited

U.S. PATENT DOCUMENTS

2018/0357086 A1   12/2018  Kinsella et al.
2022/0191139 A1*  6/2022  Dutta ...................... H04L 69/22
2022/0217613 A1*  7/2022  Teyeb ................... H04W 40/22

* cited by examiner

METHOD FOR HANDLING OF AN INBOUND SCTP PACKET AT AN SCTP LOAD BALANCER AND TUNNELING METHODOLOGY

CROSS-REFERENCE TO RELATED APPLICATIONS

This application claims priority under 35 U.S.C. § 119(e) to U.S. Provisional Pat. App. No. 63/157,335, filed Mar. 5, 2021, titled "Method for Handling of an Inbound SCTP Packet at an SCTP Load Balancer and Tunneling Methodology," which is hereby incorporated by reference in its entirety for all purposes. This application also hereby incorporates by reference, for all purposes, each of the following U.S. Patent Application Publications in their entirety: US20170013513A1; US20170026845A1; US20170055186A1; US20170070436A1; US20170077979A1; US20170019375A1; US20170111482A1; US20170048710A1; US20170127409A1; US20170064621A1; US20170202006A1; US20170238278A1; US20170171828A1; US20170181119A1; US20170273134A1; US20170272330A1; US20170208560A1; US20170288813A1; US20170295510A1; US20170303163A1; and US20170257133A1. This application also hereby incorporates by reference U.S. Pat. No. 8,879,416, "Heterogeneous Mesh Network and Multi-RAT Node Used Therein," filed May 8, 2013; U.S. Pat. No. 9,113,352, "Heterogeneous Self-Organizing Network for Access and Backhaul," filed Sep. 12, 2013; U.S. Pat. No. 8,867,418, "Methods of Incorporating an Ad Hoc Cellular Network Into a Fixed Cellular Network," filed Feb. 18, 2014; U.S. patent application Ser. No. 14/034,915, "Dynamic Multi-Access Wireless Network Virtualization," filed Sep. 24, 2013; U.S. patent application Ser. No. 14/289,821, "Method of Connecting Security Gateway to Mesh Network," filed May 29, 2014; U.S. patent application Ser. No. 14/500,989, "Adjusting Transmit Power Across a Network," filed Sep. 29, 2014; U.S. patent application Ser. No. 14/506,587, "Multicast and Broadcast Services Over a Mesh Network," filed Oct. 3, 2014; U.S. patent application Ser. No. 14/510,074, "Parameter Optimization and Event Prediction Based on Cell Heuristics," filed Oct. 8, 2014, U.S. patent application Ser. No. 14/642,544, "Federated X2 Gateway," filed Mar. 9, 2015, and U.S. patent application Ser. No. 14/936,267, "Self-Calibrating and Self-Adjusting Network," filed Nov. 9, 2015; U.S. patent application Ser. No. 15/607,425, "End-to-End Prioritization for Mobile Base Station," filed May 26, 2017; U.S. patent application Ser. No. 15/803,737, "Traffic Shaping and End-to-End Prioritization," filed Nov. 27, 2017, each in its entirety for all purposes, US02, US03, 71710US01, 71721US01, 71729US01, 71730US01, 71731US01, 71756US01, 71775US01, 71865US01, and 71866US01, respectively. This document also hereby incorporates by reference U.S. Pat. Nos. 9,107,092, 8,867,418, and 9,232,547 in their entirety. This document also hereby incorporates by reference U.S. patent application Ser. No. 14/822,839, U.S. patent application Ser. No. 15/828,427, U.S. Pat. App. Pub. Nos. US20170273134A1, US20170127409A1 in their entirety.

BACKGROUND

Stream Control Transmission Protocol (SCTP) load balancers are primarily meant for distributing the traffic load across the multiple service-endpoints running on multiple backend physical or Virtual machines. In general, Load balancers help in increasing the capacity, performance, responsiveness or availability of the applications by distributing the load across multiple backend servers and helps in scaling the system horizontally.

SCTP-LB needs to be very fast and thus, it is expected that LB shall perform minimal processing on inbound traffic for routing to the backend-servers. Also, SCTP LB needs to be persistent and have a deterministic behavior for SCTP i.e. the SCTP packets should get mapped to same service end-point based on 5 tuple values or any other unique key mechanism to identify the SCTP association. Also, we want the SCTP LB to be a stateless entity to avoid the maintenance of peer-information across service restart, etc.

One SCTP association between two peers is identified by the combination of SCTP end-points and SCTP-verification tags of each peer. A verification tag is a 4 bytes unsigned integer that uniquely identifies the current association. Each SCTP-end-point generates a unique SCTP verification tag and exchange it during the SCTP association in the SCTP Init and Init-ACK packets. Going forward, all the subsequent SCTP packets need to provide the verification tag of the peer so that the peer could validate that the SSCTP packet belongs to the correct SCTP-association.

A SCTP load balancer could maintain a map of SCTP-association and its verification tag. When the SCTP packets are received at the SCTP LB, the SCTP-LB shall identify the backend-server based on the verification tag to the backend-server map.

A better option would be to embed certain bits in the SCTP verification tag during the SCTP association which will identify the correct back-end-server instance. This way, there SCTP load balancer doesn't need to store and maintain the SCTP association and verification tag-based map to identify the backend-server. The SCTP LB just need to parse the verification tag and get the embedded instance-number of the back-end server and based on the embedded instance-number, the SCTP packets will get routed to the correct back-end server for further processing.

SCTP-LB is the entry point for the inbound SCTP packets which is achieved by configuring virtual-IP for SCTP-endpoints and hosting the Virtual-IP on SCTP-LB for ARP resolution. The back-end Server task shall have the corresponding VIP over non-ARP interfaces so that only SCTP-LB would be able to reply to the ARP and ICMP queries and thus inbound SCTP packets gets routed to SCTP-LB first.

SUMMARY

SCTP Load balancer (LB) is a critical component in a distributed network. One important aspect of SCTP LB is the requirement of single IP for the hosted service in the backend servers. The multiple backend servers shall open RAW sockets for same IP for a service. This means that SCTP LB needs to select or distribute the inbound SCTP traffic to one of the pluralities of backend servers listening on same IP and port. SCTP-LB may apply consistent Hashing algorithm over the inbound SCTP INIT at SCTP-LB and use the local SCTP verification tag, during the creation of SCTP association, as a selector to determine a back-end server for subsequent SCTP packets.

Over a virtualized deployment topology, we may have the possibility of multiple back-end-server part of the same virtual-machine or could be part of different virtual-machine e.g. case of Kubernetes or docker based deployment. Hence, there is a special need to tunnel these inbound SCTP packets to reach the correct back-end-server task over a plurality of back-end-server listening on same endpoints in the same virtual-machine or on different virtual-machine.

This idea talks about the methodology to handle the SCTP packets via tunneling and further handling of tunneled packets at the backend server tasks.

A method for handling of an inbound SCTP packet at an SCTP load balancer is described. In one embodiment the method includes selecting or distributing, by the load balancer, inbound SCTP traffic to one of a plurality of back-end servers listening on a same IP and port; applying, by the load balancer, a consistent hashing algorithm over an inbound SCTP INIT at the load balancer; and using, by the load balancer, a local SCTP verification tag during creation of an SCTP association, as a selector to determine a back-end server for subsequent SCTP packets.

In another embodiment a system for performing SCTP load balancing includes an SCTP LB; a plurality of backend servers in communication with the SCTP LB; wherein the SCTP LB receives an SCTP packet, and determines which tunneling mechanism to use for the SCTP packet; and wherein the SCTP LB tunnels the SCTP packet to a correct back-end server of the plurality of backend servers for further processing of the SCTP packet.

DETAILED DESCRIPTION

Figure 1:
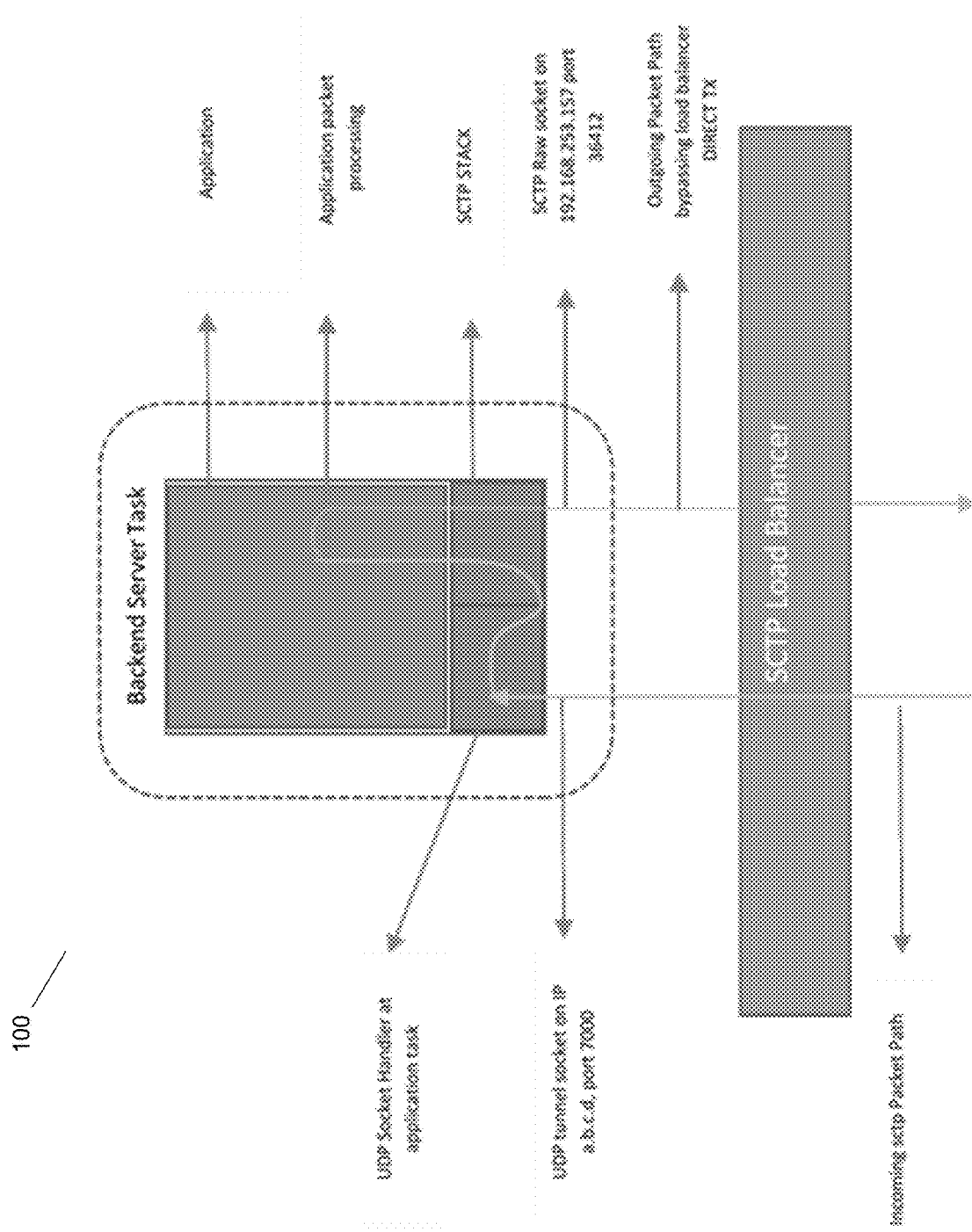
FIG. 1 is a diagram of an SCTP load balancer process flow, in accordance with some embodiments.

Once, SCTP LB identifies a back-end-server task from a plurality of backend-server tasks listening on same endpoint, SCTP LB needs to tunnel the SCTP packets to correct back-end-server task. This could be achieved by multiple tunneling mechanism such as UDP-tunneling, IP-in-IP etc. based on the requirement and deployment topology.

When multiple back-end-server tasks are spawned on same virtual-machine, then SCTP-LB shouldn't route the SCTP packet as it is to that virtual-machine. The reason is that once the kernel (of virtual-machine) receives any SCTP packet, and if there are multiple tasks listening on same SCTP end-point, then the underlying kernel creates multiple copies of same SCTP packet and sends the same SCTP packet to all the tasks listening on same end-point on that virtual-machine.

Similarly, when we have multiple back-end-server distributed across multiple virtual-machine, there also there is a need to use a different type of tunneling mechanism.

The present described method for handling of an inbound SCTP packet at an SCTP load balancer includes a tunneling methodology at the SCTP-LB to tunnel the received SCTP packets to the correct backend-server task and further how to handle the tunneled SCTP packet at the backend-server task and pass it to the corresponding SCTP-handler on back-end-task.

The back-end-servers shall install SCTP flows on SCTP-LB where it will specify the SCTP-end-points where it is going to listen, the tunneling-methodology such as UDP-tunneling, IP-in-IP and the tunneling endpoints during the initialization of SCTP-based service on the back-end-server task.

The SCTP-LB will process the received SCTP packet and then it will check if it has the corresponding SCTP-flows installed for the received SCTP packet, i.e. whether SCTP-LB has the information about the SCTP packet with respect to the tuple and which tunneling mechanism it has to use. The SCTP-LB shall tunnel the SCTP packets to the correct back-end server for further processing of the SCTP-packet.

One possible way to handle this use-case is by using the UDP-tunneling methodology.

UDP-Tunneling: When we have the use-case where multiple back-end servers are spawned on same virtual-machine or same machine, then we need to use UDP-tunneling mechanism at the SCTP-LB to tunnel the received SCTP packets to correct back-end-server task.

UDP Tunneling is required in this case, otherwise the underlying kernel of the destined virtual-machine will create multiple copies of SCTP packet and forward the same SCTP packet to all the tasks listening on that end-point which will cause failures because only one back-end-server shall have the SCTP-association and rest of the back-end-servers will not have the SCTP-association and thus, remaining back-end-server will send SCTP abort, which we don't want.

The received SCTP packet along with its IP-header is encapsulated as payload of UDP-packet and is forwarded to the correct back-end-server task.

The outbound SCTP packets could be directly sent out by-passing the SCTP-LB which is also known as Direct Server Return (DSR). The advantage of using DSR is that it will avoid the extra hop of Load-Balancer plane and thus, it will reduce the load on the SCTP-LB considerably for the Tx path.

UDP-Tunneling to SCTP-Handler Mapping:

Once the SCTP packet is delivered to the correct backend-server task in the form of UDP packet, the UDP-tunnel handler shall extract the complete IP-packet and identify the Local IP-end-point information.

FIG. 1 is a diagram of a SCTP load balancer operation flow 100.

In general, the Application running on these back-end-server shall open the SCTP RAW socket and will store the corresponding socket FD (File descriptor). The User SCTP-stack running on these back-end-server shall use the SCTP-socket to send any SCTP packets out to the destined SCTP peer. Further whenever, there is any inbound SCTP packet received by the kernel of the back-end server task, the kernel will post one event to the SCTP-stack to read the SCTP packet from the RAW socket. The SCTP-stack shall read the SCTP-packet over this SCTP-FD and map it to the corresponding SCTP-callback handler for processing of the received SCTP packet. Each back-end server task can have N-number of such SCTP endpoints on same backend-server for M-number of User applications and thus the SCTP-FD plays a vital role in identifying the corresponding SCTP-callback handler for processing of received SCTP packet.

However, the cases where we have multiple back-end-server tasks running on same backend virtual-machine or machine, the SCTP-LB can't send the SCTP packet as it to these machines, because the underlying Kernel on these back-end machine will create multiple copies of received SCTP packet and deliver one copy to each of the back-end server task listening on same end-point. Hence, UDP-tunneling mechanism is required so that the SCTP packet gets delivered as a UDP-packet to the correct backend-server task.

This methodology talks about design aspects of handling of the received UDP-tunneled SCTP packet and routing it to the correct SCTP-callback handler.

Figure 2:
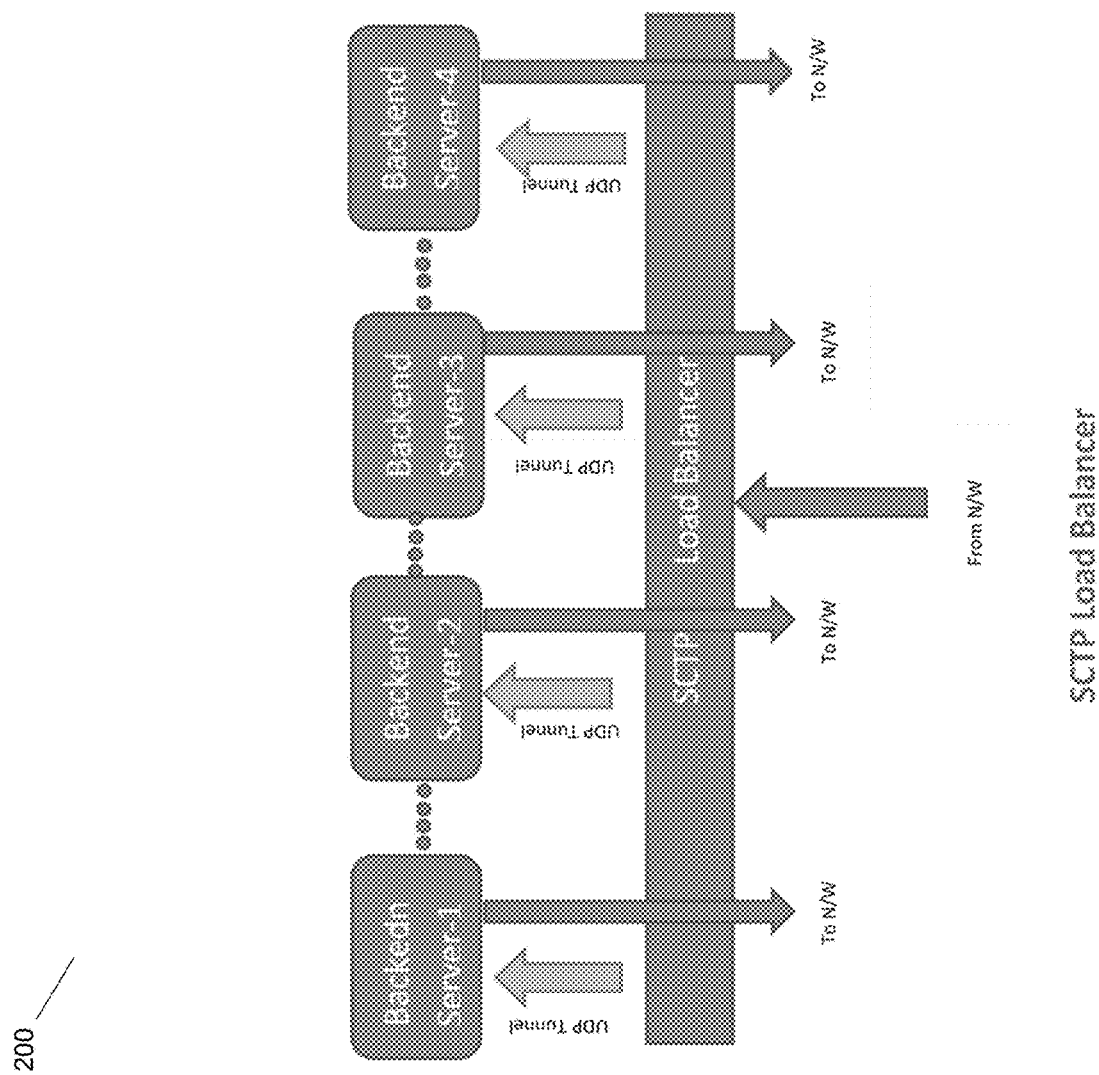
FIG. 2 is a diagram of an SCTP load balancer system, in accordance with some embodiments.

FIG. 2 is a block diagram of an SCTP load balancer 200. Whenever, the back-end-server task opens a RAW SCTP socket and gets the file descriptor i.e. SCTP-FD of the RAW socket, the same information shall be passed to the UDP-handler running on the back-end-server task. The UDP-tunnel handler shall create and maintain the mapping of SCTP-FD to the corresponding local SCTP-endpoint. Subsequently, when the UDP tunnel-handler gets the UDP-tunneled SCTP-packet as UDP-payload, it shall extract the complete IP packet and get the destined SCTP end-point information, and then do a reverse look-up based on SCTP-endpoint to fetch the SCTP-FD. Thus, the UDP-tunnel handler shall identify the corresponding SCTP-callback handler using the fetched SCTP-FD and then the SCTP packet shall be given to the SCTP-callback handler for further processing of the SCTP-packet.

IP-in-IP tunneling method: When we have the use-case where each back-end-server machine has just one entity listening on same SCTP-endpoint, then instead of using the UDP-tunneling, we can go with the IP-in-IP-tunneling method. The tunneling will still be required to forward the SCTP packet to the correct back-end server task. Once, the kernel of the back-end-server receives the encapsulated SCTP packet, the extracted SCTP packet will be fetched directly to the SCTP-stack. The IP-in-IP tunneling methodology will be useful in the cases of virtualized deployment such as Kubernetes, where each pod running on a Kubernetes node can be individually listening on same back-end-server task and thus, the SCTP-LB running separately on another Kubernetes node may do IP-in-IP tunneling based on the pre-configured SCTP-LB flows from the back-end-server and route the SCTP packet to correct back-end server pod.

SCTP is used in both 4G and 5G. Particularly, in 5G, SCTP is used as the transport layer of the NG-C signaling bearer between the NG-RAN and the 5G core, as described in 3GPP TS 38.412 v15.0.0, hereby incorporated by reference.

The present application is contemplated to include embodiments in either 4G or 5G or another radio access technology using SCTP.

Figure 3:
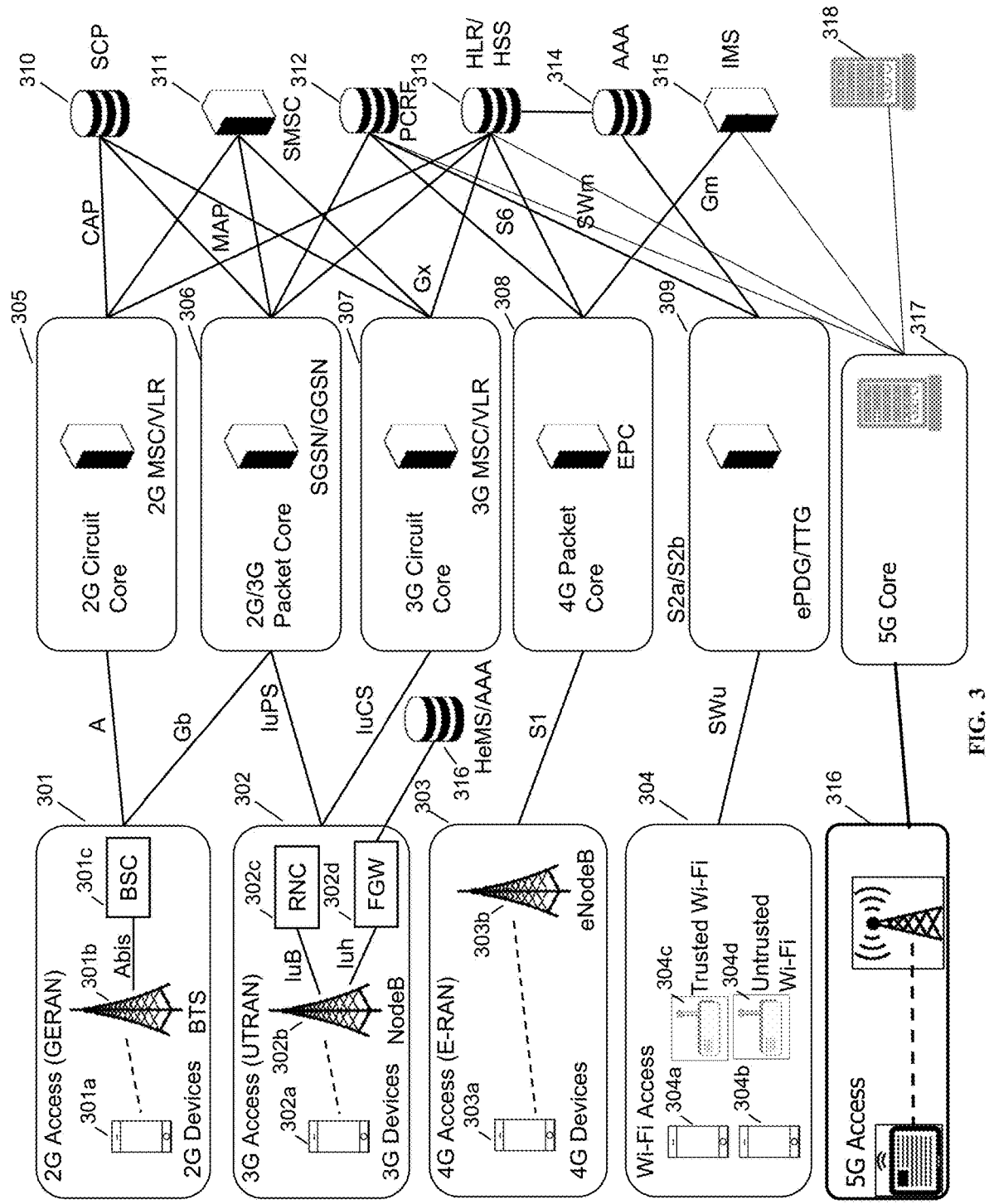
FIG. 3 is a schematic network architecture diagram for 3G and other-G prior art networks.

FIG. 3 is a schematic network architecture diagram for 3G and other-G prior art networks. The diagram shows a plurality of "Gs," including 2G, 3G, 4G, 5G and Wi-Fi. 2G is represented by GERAN 301, which includes a 2G device 301a, BTS 301b, and BSC 301c. 3G is represented by UTRAN 302, which includes a 3G UE 302a, nodeB 302b, RNC 302c, and femto gateway (FGW, which in 3GPP namespace is also known as a Home nodeB Gateway or HNBGW) 302d. 4G is represented by EUTRAN or E-RAN 303, which includes an LTE UE 303a and LTE eNodeB 303b. Wi-Fi is represented by Wi-Fi access network 304, which includes a trusted Wi-Fi access point 304c and an untrusted Wi-Fi access point 304d. The Wi-Fi devices 304a and 304b may access either AP 304c or 304d. In the current network architecture, each "G" has a core network. 2G circuit core network 305 includes a 2G MSC/VLR; 2G/3G packet core network 306 includes an SGSN/GGSN (for EDGE or UMTS packet traffic); 3G circuit core 307 includes a 3G MSC/VLR; 4G circuit core 308 includes an evolved packet core (EPC); and in some embodiments the Wi-Fi access network may be connected via an ePDG/TTG using S2a/S2b. Each of these nodes are connected via a number of different protocols and interfaces, as shown, to other, non-"G"-specific network nodes, such as the SCP 330, the SMSC 331, PCRF 332, HLR/HSS 333, Authentication, Authorization, and Accounting server (AAA) 334, and IP Multimedia Subsystem (IMS) 335. An HeMS/AAA 336 is present in some cases for use by the 3G UTRAN. The diagram is used to indicate schematically the basic functions of each network as known to one of skill in the art, and is not intended to be exhaustive. For example, 5G core 317 is shown using a single interface to 5G access 316, although in some cases 5G access can be supported using dual connectivity or via a non-standalone deployment architecture.

Noteworthy is that the RANs 301, 302, 303, 304 and 336 rely on specialized core networks 305, 306, 307, 308, 309, 337 but share essential management databases 330, 331, 332, 333, 334, 335, 338. More specifically, for the 2G GERAN, a BSC 301c is required for Abis compatibility with BTS 301b, while for the 3G UTRAN, an RNC 302c is required for Iub compatibility and an FGW 302d is required for Iuh compatibility. These core network functions are separate because each RAT uses different methods and techniques. On the right side of the diagram are disparate functions that are shared by each of the separate RAT core networks. These shared functions include, e.g., PCRF policy functions, AAA authentication functions, and the like. Letters on the lines indicate well-defined interfaces and protocols for communication between the identified nodes.

The system may include 5G equipment. 5G networks are digital cellular networks, in which the service area covered by providers is divided into a collection of small geographical areas called cells. Analog signals representing sounds and images are digitized in the phone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a common pool of frequencies, which are reused in geographically separated cells. The local antennas are connected with the telephone network and the Internet by a high bandwidth optical fiber or wireless backhaul connection.

5G uses millimeter waves which have shorter range than microwaves, therefore the cells are limited to smaller size. Millimeter wave antennas are smaller than the large antennas used in previous cellular networks. They are only a few inches (several centimeters) long. Another technique used for increasing the data rate is massive MIMO (multiple-input multiple-output). Each cell will have multiple antennas communicating with the wireless device, received by multiple antennas in the device, thus multiple bitstreams of data will be transmitted simultaneously, in parallel. In a technique called beamforming the base station computer will continuously calculate the best route for radio waves to reach each wireless device, and will organize multiple antennas to work together as phased arrays to create beams of millimeter waves to reach the device.

Figure 4:
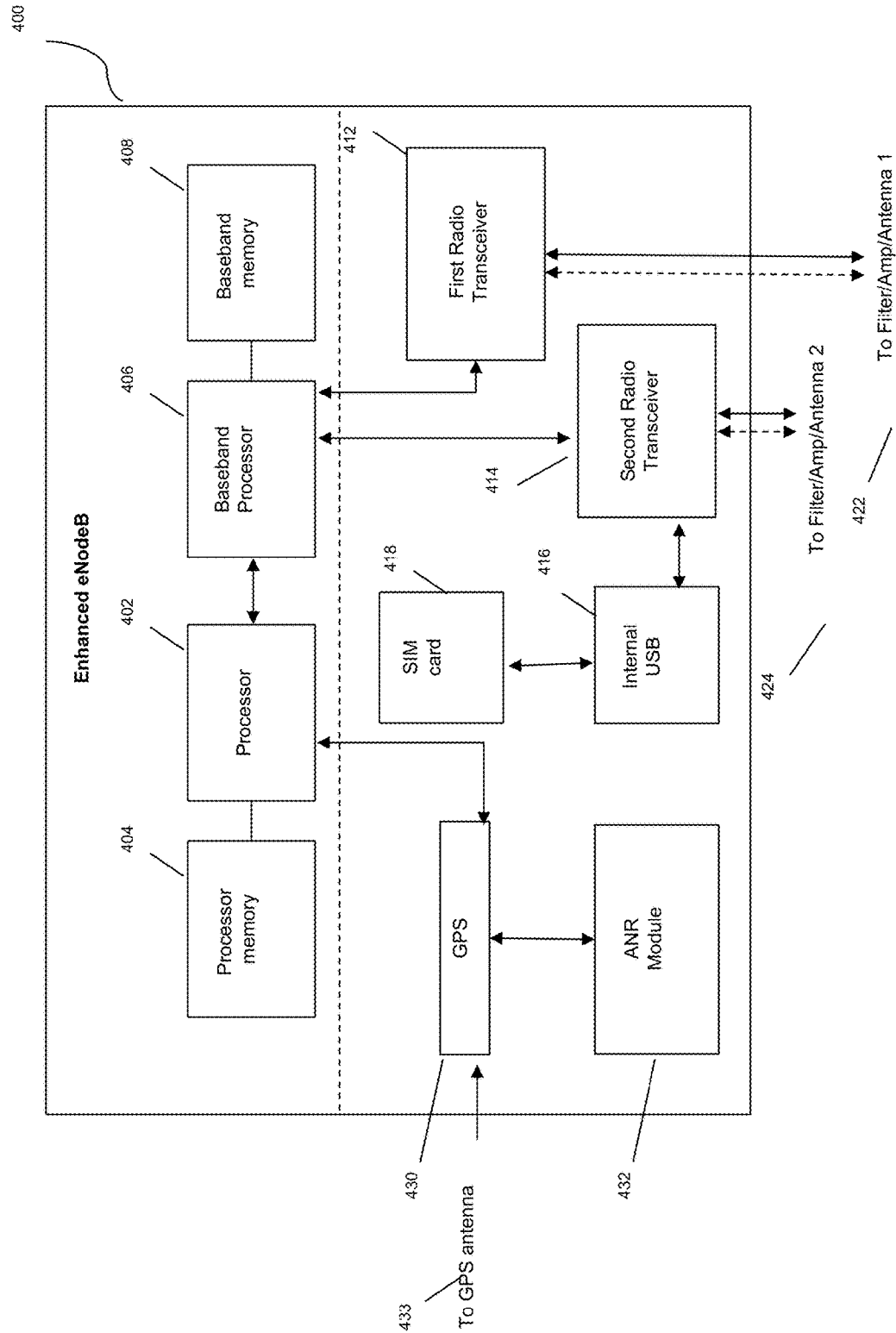
FIG. 4 is an enhanced eNodeB for performing the methods described herein, in accordance with some embodiments.

FIG. 4 is an enhanced eNodeB for performing the methods described herein, in accordance with some embodiments. eNodeB 400 may include processor 402, processor memory 404 in communication with the processor, baseband processor 406, and baseband processor memory 408 in communication with the baseband processor. Mesh network node 400 may also include first radio transceiver 412 and second radio transceiver 414, internal universal serial bus (USB) port 416, and subscriber information module card (SIM card) 418 coupled to USB port 416. In some embodiments, the second radio transceiver 414 itself may be coupled to USB port 416, and communications from the baseband processor may be passed through USB port 416. The second radio transceiver may be used for wirelessly backhauling eNodeB 400.

Processor 402 and baseband processor 406 are in communication with one another. Processor 402 may perform routing functions, and may determine if/when a switch in network configuration is needed. Baseband processor 406 may generate and receive radio signals for both radio transceivers 412 and 414, based on instructions from processor 402. In some embodiments, processors 402 and 406 may be on the same physical logic board. In other embodiments, they may be on separate logic boards.

Processor 402 may identify the appropriate network configuration, and may perform routing of packets from one network interface to another accordingly. Processor 402 may use memory 404, in particular to store a routing table to be used for routing packets. Baseband processor 406 may perform operations to generate the radio frequency signals for transmission or retransmission by both transceivers 410 and 412. Baseband processor 406 may also perform operations to decode signals received by transceivers 412 and 414. Baseband processor 406 may use memory 408 to perform these tasks.

The first radio transceiver 412 may be a radio transceiver capable of providing LTE eNodeB functionality, and may be capable of higher power and multi-channel OFDMA. The second radio transceiver 414 may be a radio transceiver capable of providing LTE UE functionality. Both transceivers 412 and 414 may be capable of receiving and transmitting on one or more LTE bands. In some embodiments, either or both of transceivers 412 and 414 may be capable of providing both LTE eNodeB and LTE UE functionality. Transceiver 412 may be coupled to processor 402 via a Peripheral Component Interconnect-Express (PCI-E) bus, and/or via a daughtercard. As transceiver 414 is for providing LTE UE functionality, in effect emulating a user equipment, it may be connected via the same or different PCI-E bus, or by a USB bus, and may also be coupled to SIM card 418. First transceiver 412 may be coupled to first radio frequency (RF) chain (filter, amplifier, antenna) 422, and second transceiver 414 may be coupled to second RF chain (filter, amplifier, antenna) 424.

SIM card 418 may provide information required for authenticating the simulated UE to the evolved packet core (EPC). When no access to an operator EPC is available, a local EPC may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 400 is not an ordinary UE but instead is a special UE for providing backhaul to device 400.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 412 and 414, which may be Wi-Fi 802.11a/b/g/n/ac/ad/ah, Bluetooth, ZigBee, microwave (including line-of-sight microwave), or another wireless backhaul connection. Any of the wired and wireless connections described herein may be used flexibly for either access (providing a network connection to UEs) or backhaul (providing a mesh link or providing a link to a gateway or core network), according to identified network conditions and needs, and may be under the control of processor 402 for reconfiguration.

A GPS module 430 may also be included, and may be in communication with a GPS antenna 432 for providing GPS coordinates, as described herein. When mounted in a vehicle, the GPS antenna may be located on the exterior of the vehicle pointing upward, for receiving signals from overhead without being blocked by the bulk of the vehicle or the skin of the vehicle. Automatic neighbor relations (ANR) module 432 may also be present and may run on processor 402 or on another processor, or may be located within another device, according to the methods and procedures described herein.

Other elements and/or modules may also be included, such as a home eNodeB, a local gateway (LGW), a self-organizing network (SON) module, or another module. Additional radio amplifiers, radio transceivers and/or wired network connections may also be included.

Figure 5:
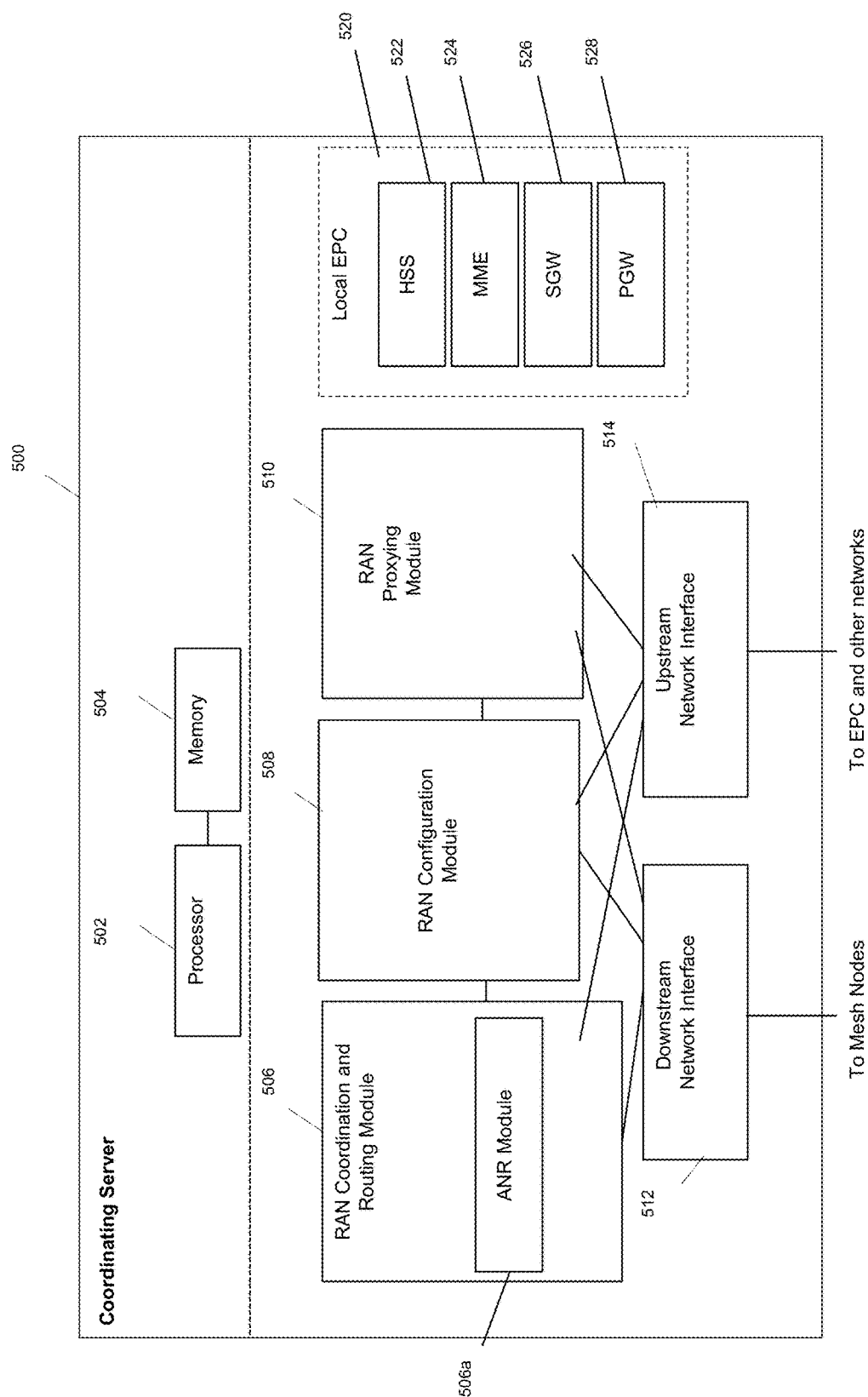
FIG. 5 is a coordinating server for providing services and performing methods as described herein, in accordance with some embodiments.

FIG. 5 is a coordinating server for providing services and performing methods as described herein, in accordance with some embodiments. Coordinating server 600 includes processor 502 and memory 504, which are configured to provide the functions described herein. Also present are radio access network coordination/routing (RAN Coordination and routing) module 506, including ANR module 506a, RAN configuration module 508, and RAN proxying module 510. The ANR module 506a may perform the ANR tracking, PCI disambiguation, ECGI requesting, and GPS coalescing and tracking as described herein, in coordination with RAN coordination module 506 (e.g., for requesting ECGIs, etc.). In some embodiments, coordinating server 500 may coordinate multiple RANs using coordination module 506. In some embodiments, coordination server may also provide proxying, routing virtualization and RAN virtualization, via modules 510 and 508. In some embodiments, a downstream network interface 512 is provided for interfacing with the RANs, which may be a radio interface (e.g., LTE), and an upstream network interface 514 is provided for interfacing with the core network, which may be either a radio interface (e.g., LTE) or a wired interface (e.g., Ethernet).

Coordinator 500 includes local evolved packet core (EPC) module 520, for authenticating users, storing and caching priority profile information, and performing other EPC-dependent functions when no backhaul link is available. Local EPC 520 may include local HSS 522, local MME 524, local SGW 526, and local PGW 528, as well as other modules. Local EPC 520 may incorporate these modules as software modules, processes, or containers. Local EPC 520 may alternatively incorporate these modules as a small number of monolithic software processes. Modules 506, 508, 510 and local EPC 520 may each run on processor 502 or on another processor, or may be located within another device.

In any of the scenarios described herein, where processing may be performed at the cell, the processing may also be performed in coordination with a cloud coordination server. A mesh node may be an eNodeB. An eNodeB may be in communication with the cloud coordination server via an X2 protocol connection, or another connection. The eNodeB may perform inter-cell coordination via the cloud communication server when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

Although the above systems and methods for providing interference mitigation are described in reference to the Long Term Evolution (LTE) standard, one of skill in the art would understand that these systems and methods could be adapted for use with other wireless standards or versions thereof. The inventors have understood and appreciated that the present disclosure could be used in conjunction with various network architectures and technologies. Wherever a 4G technology is described, the inventors have understood that other RATs have similar equivalents, such as a gNodeB for 5G equivalent of eNB. Wherever an MME is described, the MME could be a 3G RNC or a 5G AMF/SMF. Additionally, wherever an MME is described, any other node in the core network could be managed in much the same way or in an equivalent or analogous way, for example, multiple connections to 4G EPC PGWs or SGWs, or any other node for any other RAT, could be periodically evaluated for health and otherwise monitored, and the other aspects of the present disclosure could be made to apply, in a way that would be understood by one having skill in the art.

Additionally, the inventors have understood and appreciated that it is advantageous to perform certain functions at a coordination server, such as the Parallel Wireless HetNet Gateway, which performs virtualization of the RAN towards the core and vice versa, so that the core functions may be statefully proxied through the coordination server to enable the RAN to have reduced complexity. Therefore, at least four scenarios are described: (1) the selection of an MME or core node at the base station; (2) the selection of an MME or core node at a coordinating server such as a virtual radio network controller gateway (VRNCGW); (3) the selection of an MME or core node at the base station that is connected to a 5G-capable core network (either a 5G core network in a 5G standalone configuration, or a 4G core network in 5G non-standalone configuration); (4) the selection of an MME or core node at a coordinating server that is connected to a 5G-capable core network (either 5G SA or NSA). In some embodiments, the core network RAT is obscured or virtualized towards the RAN such that the coordination server and not the base station is performing the functions described herein, e.g., the health management functions, to ensure that the RAN is always connected to an appropriate core network node. Different protocols other than S1AP, or the same protocol, could be used, in some embodiments.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, 2G, 3G, 5G, TDD, or other air interfaces used for mobile telephony.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment.

The invention claimed is:

1. A method for handling of an inbound Stream Control Transmission Protocol (SCTP) packet at an SCTP load balancer (SCTP LB) comprising:
   installing, at the SCTP LB, an SCTP flow specification based on a request from a back-end server task, the SCTP flow specification including a tunneling mechanism;
   receiving, at the SCTP LB, an SCTP packet;
   determining, by the SCTP LB, the tunneling mechanism to use for the SCTP packet based on whether a single virtual machine SCTP endpoint is being used by multiple server tasks at a back-end server based on the installed SCTP flow specification;
   tunneling the SCTP packet from the SCTP LB to the back-end server for further processing of the SCTP packet;
   receiving, at the back-end server, the tunneled SCTP packet;
   extracting, at the back-end server, information of a single SCTP endpoint from the tunneled SCTP packet; and
   delivering a single copy of the SCTP packet to the single SCTP endpoint.

2. The method of claim 1 wherein the tunneling mechanism comprises User Datagram Protocol (UDP) tunneling.

3. The method of claim 1 wherein the tunneling mechanism comprises Internet Protocol (IP)-in-IP tunneling.

4. The method of claim 2 wherein UDP tunneling includes encapsulating the received SCTP packet along with an IP header of the received SCTP packet.

5. The method of claim 4 further comprising delivering the SCTP packet to the correct backend-server task in the form of a UDP packet.

6. The method of claim 5 further comprising extracting, by the UDP tunnel handler, the complete IP-packet and identifying Local IP-end-point information.

7. The method of claim 3 wherein IP-to-IP tunneling includes encapsulating the received SCTP packet along with an IP header of the received SCTP packet.

8. The method of claim 7 further comprising forwarding the SCTP packet to the correct back-end server task.

9. The method of claim 8 further comprising receiving, by a kernel of the back-end server, the encapsulated SCTP packet.

10. The method of claim 9 further comprising extracting, by the kernel of the back-end server, the SCTP packet directly to an SCTP stack.

11. An SCTP load balancer (SCTP LB) system comprising:
    a processor;
    an Internet Protocol (IP) network interface in communication with the processor;
    a memory in communication with the processor and containing instructions which cause the processor to perform load balancing of Stream Connection Transport Protocol (SCTP) packets as an SCTP load balancer (LB);
    a plurality of backend servers in communication with the SCTP LB;
    the instructions further configured to cause the processor to perform steps comprising:
    installing, at the SCTP LB, an SCTP flow specification based on a request from a back-end server task, the SCTP flow specification including a tunneling mechanism;
    receiving, at the SCTP LB, an SCTP packet;
    determining, by the SCTP LB, the tunneling mechanism to use for the SCTP packet based on whether a single virtual machine SCTP endpoint is being used by multiple server tasks at a back-end server based on the installed SCTP flow specification;
    tunneling the SCTP packet from the SCTP LB to the back-end server for further processing of the SCTP packet;
    receiving, at the back-end server, the tunneled SCTP packet;
    extracting, at the back-end server, information of a single SCTP endpoint from the tunneled SCTP packet; and
    delivering a single copy of the SCTP packet to the single SCTP endpoint.

12. The system of claim 11 wherein the tunneling mechanism comprises User Datagram Protocol (UDP) tunneling.

13. The system of claim 11 wherein the tunneling mechanism comprises Internet Protocol (IP)-in-IP tunneling.

14. The system of claim 12 wherein UDP tunneling includes encapsulating the received SCTP packet along with an IP header of the received SCTP packet.

15. The system of claim 14 wherein the SCTP packet is delivered to the correct backend-server task in the form of a UDP packet.

16. The system of claim 15 wherein the UDP tunnel handler extracts the complete IP-packet and identifies Local IP-end-point information.

17. The system of claim 13 wherein IP-to-IP tunneling includes encapsulating the received SCTP packet along with an IP header of the received SCTP packet.

18. The system of claim 17 wherein the SCTP packet is forwarded to the correct back-end server task.

19. The system of claim 18 wherein a kernel of the back-end server receives the encapsulated SCTP packet.

20. The system of claim 19 the kernel of the back-end server extracts the SCTP packet directly to an SCTP stack.

* * * * *